June 19, 1951

S. T. MENTZEL 2,557,450

LINEAR MEASURING DEVICE

Filed July 15, 1947

INVENTOR.
Sigmund T. Mentzel

BY Donald G. Dalton

HIS ATTORNEYS.

Patented June 19, 1951

2,557,450

UNITED STATES PATENT OFFICE 2,557,450

LINEAR MEASURING DEVICE

Sigmund T. Mentzel, Gary, Ind., assignor to United States Steel Company, a corporation of New Jersey Application July 15, 1947, Serial No. 761,000

3 Claims. (Cl. 235—92)

This invention relates to linear measuring devices and more particularly to devices for linear measurement of articles moving relative thereto.

The measuring device of the present invention comprises essentially a rotatably mounted wheel engageable with an article moving relatively thereto, together with means for registering distance traversed by the wheel circumference. A linear measurement of an article is indicated by the distance traversed during engagement. The device has particular application in the fabrication of steel for measuring lengths of steel bars as they emerge from rolls prior to cutting, but obviously use of the device is not limited to this or any other particular application.

The principal object of the present invention is to provide improved measuring devices for determining a linear dimension of an article moving relative thereto without impeding motion or otherwise interfering with operations being performed on the article.

Other objects of the invention are to provide improved measuring devices for expeditiously furnishing linear measurements to a degree of precision and accuracy consistent with the needs of a particular application; to provide improved measuring devices wherein a rotatable wheel engages an article moving relatively thereto and the length of the article is determined by the number of revolutions and fraction thereof undergone by the wheel during engagement with the article; and to provide improved circuits for actuating a revolution counter and fractional revolution indicating means.

In accomplishing these and other objects of the present invention, I have provided improved structural arrangements and electric circuits, preferred forms of which are shown in the accompanying drawings, wherein.

Figure 1:
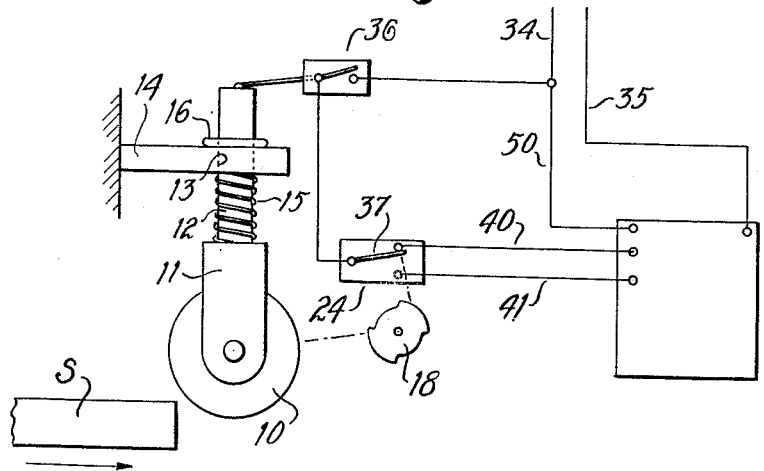
Figure 1 is a diagrammatic view showing a measuring device embodying features of the present invention.
Figure 2:
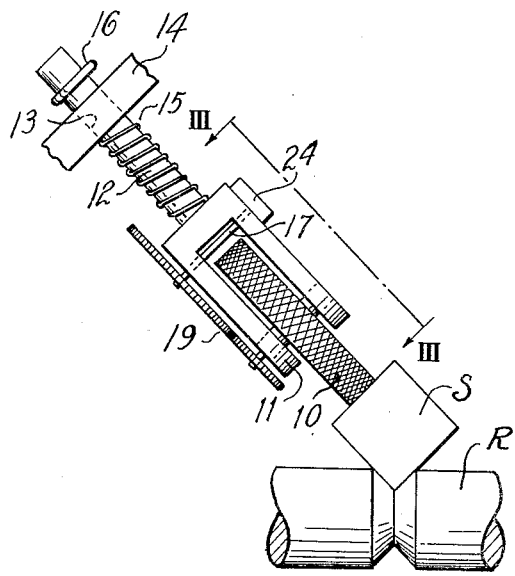
Figure 2 is an end elevational view of a preferred form of article engaging means embodied in the measuring device.

Referring more in detail to the drawings:

In Figures 1 and 2 there is shown at 10 an idler wheel which preferably has a knurled circumferential surface and is rotatably mounted in a bearing member 11. Said wheel is adapted to bear against an article S for measuring a linear dimension thereof. Article S is here illustrated as a steel bar emerging from rolls R prior to being cut to shorter lengths.

A spindle 12 extends from the top of bearing member 11 and is slidably received through an aperture 13 in a bracket 14, which may be supported by any suitable means, not shown. A compression spring 15 bears between bracket 14 and bearing member 11 and thus tends to push the wheel to outermost position with respect to the bracket, such position being limited by appropriate stop means on the spindle, as for example collar 16.

The bearing member is raised slightly relative to the bracket in a direction normal to the relative movement of the article on engagement of the wheel with the article and is lowered slightly on disengagement. This raising and lowering operates a limit switch hereinafter described.

Preferably the circumferential measurement of wheel 10 is equal to an integral multiple of an established linear unit. For purposes of the present description, I shall describe said circumference as being four feet. However, it is obvious that this measurement could be in units other than feet or in multiples other than four without departing from the invention.

Figure 3:
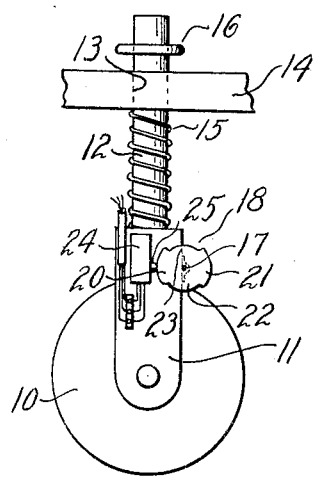
Figure 3 is a side elevational view of the article engaging means taken substantially on line III—III of Figure 2, the gears being omitted for sake of clarity.

A shaft 17 is rotatably mounted on bearing member 11 and carries a cam 18. (Figures 1 and 3.) Said shaft is geared to rotate with wheel 10 by gears 19. The gear ratio is preferably such that cam 18 makes an integral number of complete revolutions each time the circumference of wheel 10 traverses one distance unit or integral multiple of such unit. In the embodiment illustrated, the cam makes one complete revolution each time the circumference of wheel 10 traverses one foot, the gear ratio being 1:4. However, it is obvious that this relation may admit many modifications without departing from the invention.

Cam 18 is preferably of outline as illustrated in Figure 3. Said cam includes one or more sectors of large radius and one or more sectors of small radius. The number of such sectors is governed by the denominator of the fractional parts to be indicated by the fractional revolution indicating means hereinafter described as well as by the gear ratio between the wheel and cam. For purposes of the present description such denominator is chosen as 4, and the cam has two sectors 20 and 21 of large radius and two sectors 22 and 23 of small radius, the sectors all being of equal arcuate measurement. Therefore the cam rotates through one segment for each one-fourth foot traversed by the circumference of wheel 10 and the indicating means shows the distance traversed by said circumference to the nearest lower one-fourth foot. If greater or lesser degrees of precision of measurement are required, the denominator can be varied by inclusion of more or fewer relays in the indicating mechanism hereinafter described and by proper design of the cam and gear ratio.

A double throw impulsing switch 24 is mounted on bearing member 11 and includes a cam follower 25 engaged with the circumference of cam 18. (Figure 3.) As said cam rotates, each time a different sector engages said cam follower impulsing switch 24 is moved to its opposite throw and actuates one of the relays in the indicating mechanism hereinafter described.

Figure 4:
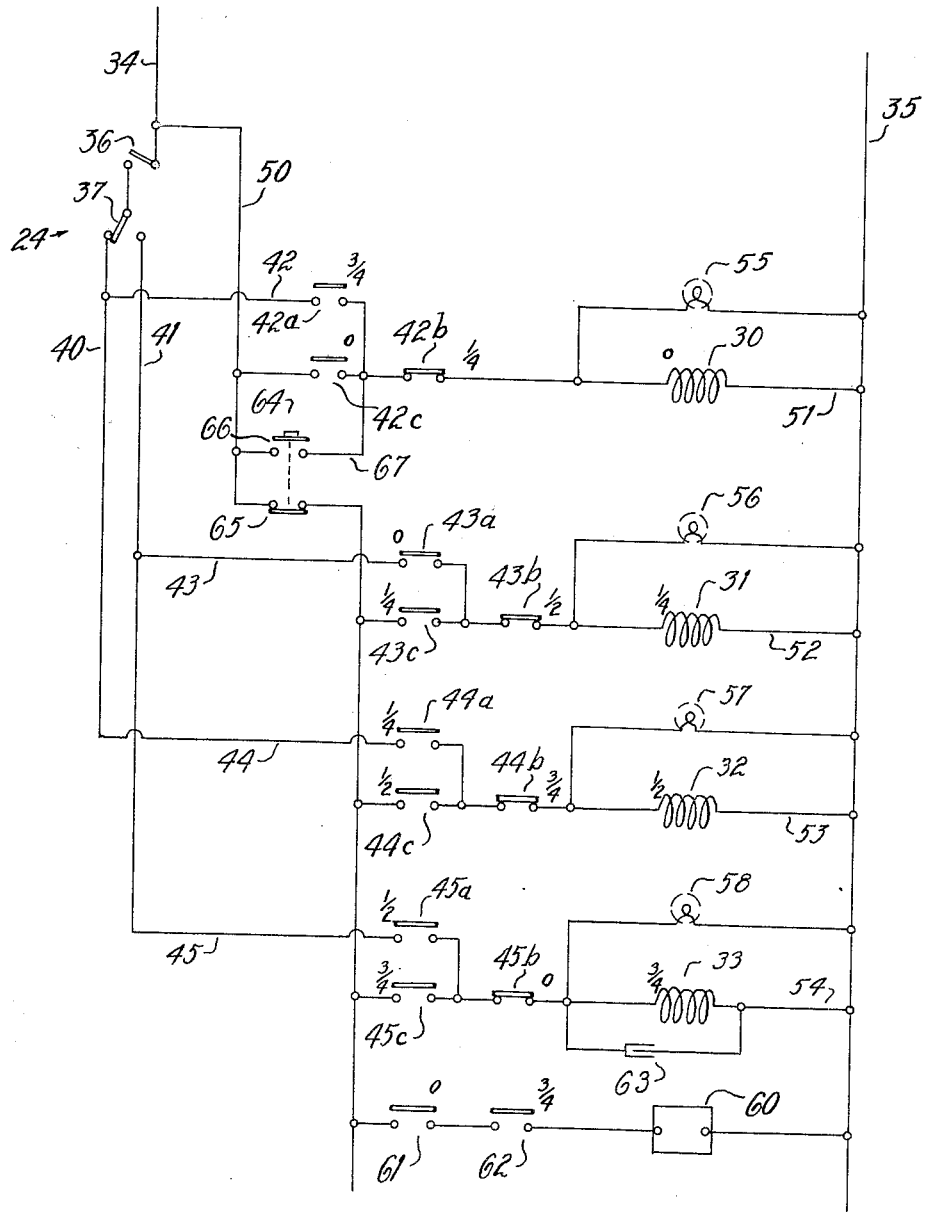
Figure 4 is a diagrammatic showing of a preferred electric circuit for actuating the counting mechanism and fractional indicating mechanism, which together show a linear measurement of an article.

The circuit for the indicating mechanism is shown diagrammatically in Figure 4. In the embodiment illustrated, said circuit includes four electromagnetic relays having coils 30, 31, 32 and 33. These relays may be considered respectively the 0, ¼, ½ and ¾ relays and their coils are designated as such by appropriate legends in Figure 4. Each relay includes a plurality of switches, some of which are normally open and some normally closed. In Figure 4, the various switches have legends, 0, ¼, ½ and ¾ designating the relay in which they are included. The switches normally open are shown open and those normally closed are shown closed, which is the position of the indicating mechanism when no electric current is applied to the circuit.

The circuit includes lines 34 and 35 connected to any suitable outside power source.

A limit switch 36, previously referred to in connection with the mounting of spindle 12, is included in line 34. When the spindle is raised, the limit switch is closed and the indicating mechanism may operate. (See Figure 1.) When the spindle is lowered the limit switch is opened and operation ceases. Thus the limit switch insures that the indicating mechanism operates precisely for the period of engagement between wheel 10 and the article being measured.

Beyond the limit switch line 34 is connected to an arm 37 in impulsing switch 24. Said arm is adapted to connect line 34 to either of two conductors 40 or 41, depending on the position of rotation of cam 18 with respect to cam follower 25. For example, in the construction illustrated, when one of cam sectors 20 or 21 of large radius engages said cam follower, arm 37 connects line 34 to conductor 40, and when one of cam sectors 22 or 23 of small radius engages said cam follower, arm 37 connects line 34 to conductor 41. (See Figure 1.)

As shown in Figure 4, conductor 40 is connected to the 0 and ½ relay coils via conductors 42 and 44, respectively, and conductor 41 is connected to the ¼ and ¾ relay coils by conductors 43 and 45, respectively. Conductors 42, 43, 44 and 45 each contain a normally open conditioning switch 42a, 43a, 44a and 45a, respectively, positioned to be closed by actuation of the ¾, 0, ¼ and ½ relays, which in each instance is the relay next preceding the relay coil to which the conductor is connected. Conductors 42, 43, 44 and 45 also each contain a normally closed cut-off switch 42b, 43b, 44b, and 45b, respectively, positioned to be opened by actuation of the ¼, ½, ¾ and 0 relays, which in each instance is the next succeeding relay.

A conductor 50 is connected to line 34 ahead of switch 36, and is connected to each of conductors 42, 43, 44 and 45 between the conditioning switch and the cut-off switch through a normally open hold switch 42c, 43c, 44c and 45c, respectively. Said hold switches are closed on actuation of the 0, ¼, ½ and ¾ relays, respectively, which in each instance is the relay in which they are included.

The opposite ends of the 0, ¼, ½ and ¾ relay coils are connected to line 35 by conductors 51, 52, 53 and 54, respectively. Indicator lamps 55, 56, 57 and 58 are connected between conductors 42, 43, 44 and 45 and line 35 either in parallel, as illustrated, or in series with the 0, ¼, ½ and ¾ relay coils, respectively, so that one of these lamps is lighted as long as the corresponding relay is actuated.

From the description thus far of the circuit, it is seen that current may flow through each of the relay coils and the corresponding lamps via either of two alternate parallel paths. In the case of the 0 relay coil and lamp 55 these paths are: (1) via line 34, arm 37, conductor 40, conductor 42, conditioning switch 42a, cut-off switch 42b, through the relay coil and lamp, conductor 51 and line 35, or (2) vial line 34, conductor 50, hold switch 42c, cut-off switch 42b, through the relay coil and lamp, conductor 51, and line 35. Similarly two alternate paths can be traced for the other relays, the first via conductor 40 or 41 and the second via conductor 50.

The circuit further includes a counter 60, a normally open counter actuation switch 61 in the 0 relay and a normally open counter actuation switch 62 in the ¾ relay. Counter 60 and counter actuation switches 61 and 62 are connected in series with each other and between lines 50 and 35. Whenever said counter actuation switches are closed simultaneously a current impulse may flow through said counter.

Counter 60 is a mechanism designed to count and record the number of electrical impulses passing therethrough. Inasmuch as such equipment is known and per se does not form a part of the present invention, no detailed description is furnished.

A condenser 63 is connected in parallel with the ¾ relay coil so that current may flow through said relay coil and maintain actuation of the relay for a brief interval after the circuit to the coil has been broken by actuation of the 0 relay, which opens cut-off switch 45b to the ¾ relay coil. Thus it is seen that just following actuation of the 0 relay, switches 61 and 62 are both closed for an instant and a current impulse passes through counter 60.

A reset switch 64 is included in the circuit for initial actuation of the 0 relay and the de-actuation of any other relay left actuated from a previous operation. Said switch includes a normally closed contact 65 in conductor 50 between the connection to the 0 relay coil and ¼ relay coil for de-actuating any relay other than the 0 relay that may be actuated via the second current path as a result of previous operation of the device, and a normally open contact 66 for actuating the 0 relay via a current path 67, which shunts the normally open hold switch. Reset switch 64 is preferably of the push-button type and is spring held in the position where conductor 50 is closed and shunt current path 67 is open.

The operation of a measuring device constructed as described is as follows:

Reset switch 64 is pressed manually to break the circuit in conductor 50 and thereby de-actuate the ¼, ½, or ¾ relay, that may be actuated from a previous operation. Pressing this switch also closes shunt current path 67 and thereby completes the circuit through the 0 relay coil and indicator lamp 55. Actuation of the relay closes hold switch 42c and current flows through the relay coil through the second path, namely via conductor 34, conductor 50, hold switch 42c, cut-out switch 42b, through the coil and lamp, conductor 51 and conductor 35. Actuation of the 0 relay also closes conditioning switch 43a to the ¼ relay and at the same time closes counter actuating switch 61 and opens cut-off switch 45b to the ¾ relay coil. However, these last two switches do not enter into operation at the start of the initial cycle, but only between subsequent cycles. Counter 60 is turned to zero.

After setting of the device as described, idler wheel 10 is brought into engagement with article S, the length of which is to be measured. Spindle 12 is raised by the engagement and limit switch 36 is thereby closed so that current may flow to arm 37 of impulse switch 24. Relative longitudinal travel of the article rotates idler wheel 10 and cam 18.

It is apparent that the idler wheel and cam may rotate in either direction and the operation of the device is not changed. For purposes of illustration, I have shown the idler wheel as rotating counter-clockwise and the cam as geared thereto to rotate clockwise, as viewed in Figures 1 and 3.

Initially cam follower 25 may be in engagement either with a cam sector of large radius 20, 21 or with a sector of small radius 22, 23. It is ordinarily unnecessary to reset the cam to a zero point, since the error introduced by failure to reset increases the final reading and tends to compensate the error introduced by readings taken to the nearest lower fraction of a unit.

Assuming that the cam follower initially engages a cam sector of large radius on closing of the limit switch, current flows through the 0 relay coil and lamp 55 via conductor 34, conductor 50, hold switch 42c, cut-off switch 42b, through the coil and lamp, and conductor 35. This condition continues until the follower engages a cam sector of small radius, which initially may represent cam rotation through any angle up to one fourth of a revolution. At this point the position of arm 37 of impulsing switch 24 is changed so that it breaks the circuit to conductor 40 and completes the circuit to conductor 41.

Since the normally open conditioning switch 43a to the ¼ relay coil is in closed position by virtue of the continued actuation of the 0 relay, current now flows through the ¼ relay coil and corresponding lamp 56 via the first current path (namely via conductor 41, etc.). Actuation of the ¼ relay opens cut-off switch 42b to the 0 relay coil and thereby de-actuates said relay and the corresponding lamp. At the same time actuation of the ¼ relay closes hold switch 43c to maintain its own actuation via the second current path (namely via conductor 50, etc.). Also conditioning switch 44a to the ½ relay coil is closed.

In like manner continued rotation of the cam alternately energizes conductors 40 and 41 through repeated cycles and, with each change, the succeeding relay is actuated and its corresponding indicator lamp is lighted.

When initially the cam follower engages a cam sector of small radius, closing of limit switch 36 immediately actuates the ¼ relay. The action is similar to that occurring when arm 37 is moved on cam rotation, namely that energization of the ¼ relay coil opens cut-off switch 42b to the 0 relay coil and closes hold switch 43c to the ¼ relay coil. Subsequent operations of the device is similar to that just described. The additional error caused by starting with a reading of ¼ foot is still a compensating error, and for most purposes not objectionable.

When actuation of the 0 relay opens cut-off switch 45b to the ¾ relay coil, flow of current through said coil is maintained for an instant by condenser 63, and thus counter actuation switch 62 is maintained closed momentarily. At the same time counter actuation switch 61 is closed by actuation of the 0 relay. A current impulse then passes through counter 60 which registers and counts such impulses. Both counter actuation switches are closed simultaneously at the conclusion of each cycle, which occurs once during each revolution of cam 18.

The number of impulses registered on the counter thus equals the number of complete revolutions of the cam. This number is equivalent to the number of linear units traversed by the circumference of wheel 10, less fractions. One of lamps 55, 56, 57 and 58 is lighted and indicates fractional parts of units, in this case fourths.

When wheel 10 passes off the far end of article 3, spindle 12 returns to lowered position and thereby opens limit switch 36. Such opening prevents any further rotation of wheel 10 from registering on the indicator, since the circuit to the impulsing switch is now broken and the first circuit to the relay coils (namely via conductor 40 or 41, etc.) cannot be completed.

At this stage the reading on the counter shows the whole number of feet of length of the article and the lamp that is lighted shows the remaining fractional length in units of one fourth foot. The lamp remains lighted after opening of the limit switch, since the second circuit thereto (namely via conductor 50, etc.) is not broken until reset button 64 is depressed.

From the foregoing description it is seen that I have provided an improved device for linear measurement of any desired precision and one that does not interfere with relative movement of an article or with other operations. For example, a steel bar emerging from rolls may be accurately measured to within one-fourth foot without in any way interfering with the rolling operation. Such measurement is desirable to enable the bar to be cut to a chosen number of equal lengths of specific dimensional tolerance without wasting the last piece.

While I have shown but a single embodiment, it is apparent that modifications are possible. Therefore, I do not wish to be limited by the disclosure set forth but only by the scope of the appended claims.

I claim:

1. An indicating mechanism comprising a plurality of relay coils, a double throw switch, conductors connecting alternate coils to one throw of said switch and the other alternate coils to the other throw of said switch, and thus furnishing first current paths to each of said coils, conductors furnishing second current paths to each of said coils, normally open conditioning contacts connected to the conductors which furnish said first current paths to each coil closed in each instance by energization of the next preceding coil, normally open hold contacts connected to the conductors which furnish said second current paths to each coil closed in each instance by energization of the same coil, normally closed cut-off contacts in the conductors to each coil effective to break both of said current paths opened in each instance by energization of the next succeeding coil, and a counter which is energized from said second current path following each cycle of energization of all of said coils.

2. An indicating mechanism comprising a plurality of relay coils, one of which is a zero coil, a double throw switch, conductors connecting alternate coils to one throw of said switch and the other alternate coils to the other throw of said switch and thus furnishing first current paths to each of said coils, conductors furnishing second current paths to each of said coils, normally open conditioning contacts connected to the conductors which furnish said first current paths to each coil closed in each instance by energization of the next preceding coil, normally open hold contacts connected to the conductors which furnish said second current paths to each coil closed in each instance by energization of the same coil which occurs when said double throw switch is actuated after the conditioning contacts to the particular coil are closed, normally closed cut-off contacts in the conductors to each coil effective to break both of said current paths opened in each instance by energization of the next succeeding coil, a reset switch in the conductor which furnishes said second current path to said zero coil, and a counter which is energized from said second current path following each cycle of energization of all of said coils.

3. In a linear measuring device which has a wheel adapted to traverse an article, an electric circuit having a double throw switch and means for reversing the throw of said switch each time the wheel circumference traverses a pre-selected fractional linear unit, a mechanism for indicating the integral and fractional linear units which the wheel circumference traverses comprising a plurality of relay coils corresponding in number to the denominator of the pre-selected fractional unit, one of said coils being a zero coil and others of said coils being for each numerator of the fractional units, conductors connecting alternate coils to one throw of said switch and the other alternate coils to the other throw of said switch and thus furnishing first current paths to each of said coils, conductors furnishing second current paths to each of said coils, normally open conditioning contacts connected to the conductors which furnish said first current paths to each coil closed in each instance by energization of the next preceding coil, normally open hold contacts connected to the conductors which furnish said second current paths to each coil closed in each instance by energization of the same coil which occurs when said double throw switch is actuated after the conditioning contacts to the particular coil are closed, normally closed cut-off contacts in the conductors to each coil effective to break both of said current paths opened in each instance by energization of the next succeeding coil, a reset switch in the conductor which furnishes said second current path to said zero coil, the coil which is energized thus indicating the numerator of the fractional unit traversed by the wheel circumference and a counter which is energized from said second current path following each cycle of energization of all of said coils to indicate the integral number of units traversed by the wheel circumference.

SIGMUND T. MENTZEL.

REFERENCES CITED

The following references are of record in the file of this patent:

UNITED STATES PATENTS

| Number | Name | Date |
| --- | --- | --- |
| 1,127,466 | McBerty | Feb. 9, 1916 |
| 1,451,280 | Sundh et al. | Apr. 10, 1923 |
| 1,455,277 | Sundh et al. | May 15, 1923 |
| 1,653,736 | Shackleton | Dec. 27, 1927 |
| 2,008,909 | Hershey | July 23, 1935 |
| 2,118,424 | Watanabe | May 24, 1938 |
| 2,206,660 | Bryce | July 2, 1940 |
| 2,208,270 | Grout | July 16, 1940 |
| 2,264,500 | Baughman | Dec. 2, 1941 |
| 2,294,566 | Malm et al. | Sept. 1, 1942 |
| 2,295,787 | Hirth | Sept. 15, 1942 |
| 2,451,489 | Joel | Oct. 19, 1948 |